United States Patent
Erhart et al.

(10) Patent No.: US 7,346,151 B2
(45) Date of Patent: Mar. 18, 2008

(54) METHOD AND APPARATUS FOR VALIDATING AGREEMENT BETWEEN TEXTUAL AND SPOKEN REPRESENTATIONS OF WORDS

(75) Inventors: George W. Erhart, Pataskala, OH (US); Valentine C. Matula, Granville, OH (US); David Skiba, Columbus, OH (US)

(73) Assignee: Avaya Technology Corp., Basking Ridge, NJ (US)

( * ) Notice: Subject to any disclaimer, the term of this patent is extended or adjusted under 35 U.S.C. 154(b) by 628 days.

(21) Appl. No.: 10/602,168

(22) Filed: Jun. 24, 2003

(65) Prior Publication Data

US 2004/0264652 A1 Dec. 30, 2004

(51) Int. Cl.
*H04M 11/06* (2006.01)

(52) U.S. Cl. .............................. 379/88.14; 379/265.08; 704/270

(58) Field of Classification Search ............. 379/88.01, 379/88.02, 88.03, 88.04, 88.14, 88.13, 265.06, 379/265.07; 704/231, 235, 239, 240, 252, 704/254, 256, 270, 277
See application file for complete search history.

(56) References Cited

U.S. PATENT DOCUMENTS

| | | | |
|---|---|---|---|
| 6,175,822 B1 * | 1/2001 | Jones ........................... 704/270 |
| 6,278,772 B1 * | 8/2001 | Bowater et al. .......... 379/88.13 |
| 6,721,416 B1 * | 4/2004 | Farrell .................... 379/265.07 |
| 6,754,626 B2 * | 6/2004 | Epstein ....................... 704/235 |
| 6,766,294 B2 * | 7/2004 | MacGinite et al. .......... 704/235 |
| 6,868,154 B1 * | 3/2005 | Stuart et al. ............ 379/265.06 |
| 2002/0169606 A1 | 11/2002 | Bantz et al. ................. 704/235 |

(Continued)

FOREIGN PATENT DOCUMENTS

WO WO 0036591 6/2000

(Continued)

OTHER PUBLICATIONS

Jennifer Chu-Carroll, "A Statistical Model for Discourse Act Recognition in Dialogue Interactions," http://citeseer.nj.nec.com/20046.html (1998), no month.

(Continued)

*Primary Examiner*—Gerald Gauthier
(74) *Attorney, Agent, or Firm*—Ryan, Mason & Lewis, LLP

(57) ABSTRACT

A method and apparatus are disclosed for validating agreement between textual and spoken representations of words. A voice input verification process monitors a conversation between an agent and a caller to validate the textual entry of the caller's spoken responses or the agent's spoken delivery of a textual script (or both). The audio stream corresponding to the conversation between the agent and the caller is recorded and the textual information that is entered into the workstation by the agent is evaluated. Speech recognition technology is applied to the recent audio stream, to determine if the words that have been entered by the agent can be found in the recent audio stream. The grammar employed by the speech recognizer can be based, for example, on properties of the spoken words or the type of field being populated by the agent. If there is a discrepancy between what was entered by the agent and what was recently spoken by the caller, the agent can be alerted and the error can optionally be corrected.

25 Claims, 6 Drawing Sheets

U.S. PATENT DOCUMENTS

2003/0105630 A1* 6/2003 MacGinitie et al. ........ 704/235
2004/0015351 A1* 1/2004 Gandhi et al. .............. 704/240

FOREIGN PATENT DOCUMENTS

WO     WO 03052739     6/2003

OTHER PUBLICATIONS

J.G.A. Dolfing and A. Wendemuth, "Combination Of Confidence Measures In Isolated Word Recognition," Proc. of the Int'l Conf. on Spoken Language Processing, http://citeseer.nj.nec.com/dolfing98combination.html (1998), no month.

Anand R. Setlur et al., "Correcting Recognition Errors Via Discriminative Utterance Verification," Proc. Int'l Conf. on Spoken Language Processing, http://citeseer.nj.nec.com/setlur96correcting.html (1996), no month.

Andreas Stolcke et al., "Dialog Act Modeling for Conversational Speech," Proc. of the AAAI-98 Spring Symposium on Applying Machine Learning to Discourse Processing, http://citeseer.nj.nec.com/stolcke98dialog.html (1998), no month.

Gethin Williams and Steve Renals, "Confidence Measures Derived From An Acceptor HMM," Proc. Int'l Conf. on Spoken Language Processing (1998), no month.

Helen Wright, "Automatic Utterance Type Detection Using Suprasegmental Features," Centre for Speech Technology Research, University of Edinburgh, Edinburgh, U.K., http://citeseer.nj.nec.com/wright98automatic.html (1998), no month.

Lin Zhong et al., "Improving Task Independent Utterance Verification Based On On-Line Garbage Phoneme Likelihood," http://www.ee.princeton.edu/~lzhong/publications/report-UV-2000.pdf (2000), no month.

* cited by examiner

METHOD AND APPARATUS FOR VALIDATING AGREEMENT BETWEEN TEXTUAL AND SPOKEN REPRESENTATIONS OF WORDS

FIELD OF THE INVENTION

The present invention relates generally to call centers or other call processing systems in which a person's spoken words are entered by a call center operator into a computer as text for further processing (or vice versa).

BACKGROUND OF THE INVENTION

Many companies employ call centers to provide an interface for exchanging information with customers. In many call center environments, a customer service representative initially queries a caller for specific pieces of information, such as an account number, credit card number, address and zip code. The customer service representative then enters this information into a specific field on their terminal or workstation. There are a number of ways in which errors may be encountered when entering the customer information. For example, the customer service representative may not understand the caller correctly, and may hear the information differently than it was spoken by the caller. In addition, the customer service representative may forget, transpose, or otherwise mistype some of the information as it is entered into the workstation.

Call centers often employ interactive voice response (IVR) systems, such as the CONVERSANT® System for Interactive Voice Response, commercially available from Avaya Inc., to provide callers with information in the form of recorded messages and to obtain information from callers using keypad or voice responses to recorded queries. An IVR converts a caller's voice responses into a textual format for computer-based processing. While IVR systems are often employed to collect some preliminary customer information, before the call is transferred to a live agent, they have not been employed to work concurrently with a live agent and to assist a live agent with the entry of a caller's spoken words as text. A need therefore exists for a method and apparatus that employ speech technology to validate the accuracy of a customer service representative's textual entry of a caller's spoken responses.

SUMMARY OF THE INVENTION

Generally, a method and apparatus are disclosed for validating agreement between textual and spoken representations of words. According to one aspect of the invention, a voice input verification process monitors a conversation between an agent and a caller to validate the textual entry of the caller's spoken responses. According to another aspect of the invention, the voice input verification process monitors the conversation between the agent and the caller to validate the agent's spoken delivery of a textual script.

A disclosed voice input verification process digitizes and stores the audio stream corresponding to the conversation between the agent and the caller and observes the textual information that is entered into the workstation by the agent. The voice input verification process applies speech recognition technology to the recent audio stream, to determine if the words that have been entered by the agent (or spoken by the agent) can be found in the recent audio stream. The grammar employed by the speech recognizer can be based, for example, on properties of the spoken words or the type of field being populated by the agent. If there is a discrepancy between what was entered by the agent and what was recently spoken by the caller, the agent can be alerted. The voice input verification process can optionally suggest corrections to the data. In this manner, the accuracy of the textual input is improved while reducing the need to have the caller repeat information.

A more complete understanding of the present invention, as well as further features and advantages of the present invention, will be obtained by reference to the following detailed description and drawings.

DETAILED DESCRIPTION

Figure 1:
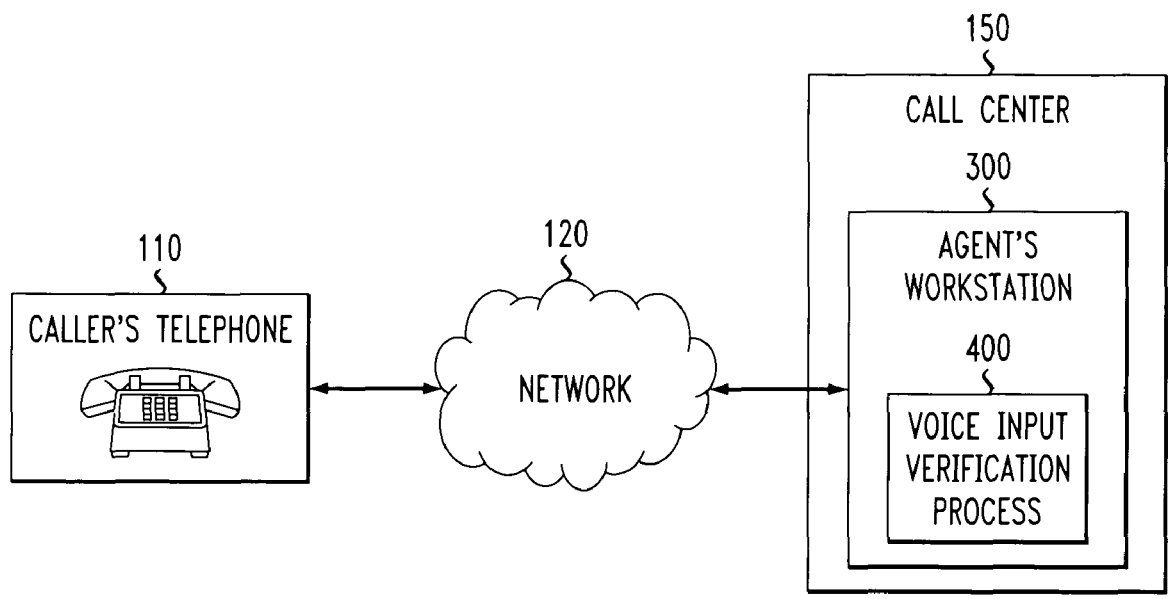
FIG. 1 illustrates a network environment in which the present invention can operate.

FIG. 1 illustrates a network environment in which the present invention can operate. As shown in FIG. 1, a caller, employing a telephone 110, places a telephone call to a call center 150 and is connected to a call center agent employing a workstation 300, discussed further below in conjunction with FIG. 3. The telephone 110 may be embodied as any device capable of establishing a voice connection over a network 120, such as a conventional, cellular or IP telephone. The network 120 may be embodied as any private or public wired or wireless network, including the Public Switched Telephone Network, Private Branch Exchange switch, Internet, or cellular network, or some combination of the foregoing.

As shown in FIG. 1, and discussed further below in conjunction with FIG. 4, the workstation 300 includes a voice input verification process 400 that validates the accuracy of the call center agent's textual entry of the caller's spoken responses into the workstation 300. In a further variation, the voice input verification process 400 can also optionally validate the accuracy of the call center agent's spoken delivery of a textual script. According to one aspect of the invention, the voice input verification process 400 monitors the conversation between the agent and the caller, as well as the agent's use of the workstation 300, and validates the textual entry of the caller's spoken responses or the agent's spoken delivery of a textual script (or both).

Generally, the voice input verification process 400 digitizes and stores the audio stream corresponding to the conversation between the agent and the caller and observes the textual information that is entered into the workstation 300 by the agent. The voice input verification process 400 then applies speech recognition technology to the recent audio stream, to determine if the words that have been entered by the agent can be found in the recent audio stream. If there is a discrepancy between what was entered by the agent and what was recently spoken by the caller, the agent can be alerted. In a further variation, the voice input verification process 400 can also suggest corrections to the data. In this manner, the accuracy of the textual input is improved while reducing the need to have the caller repeat information.

Figure 2:
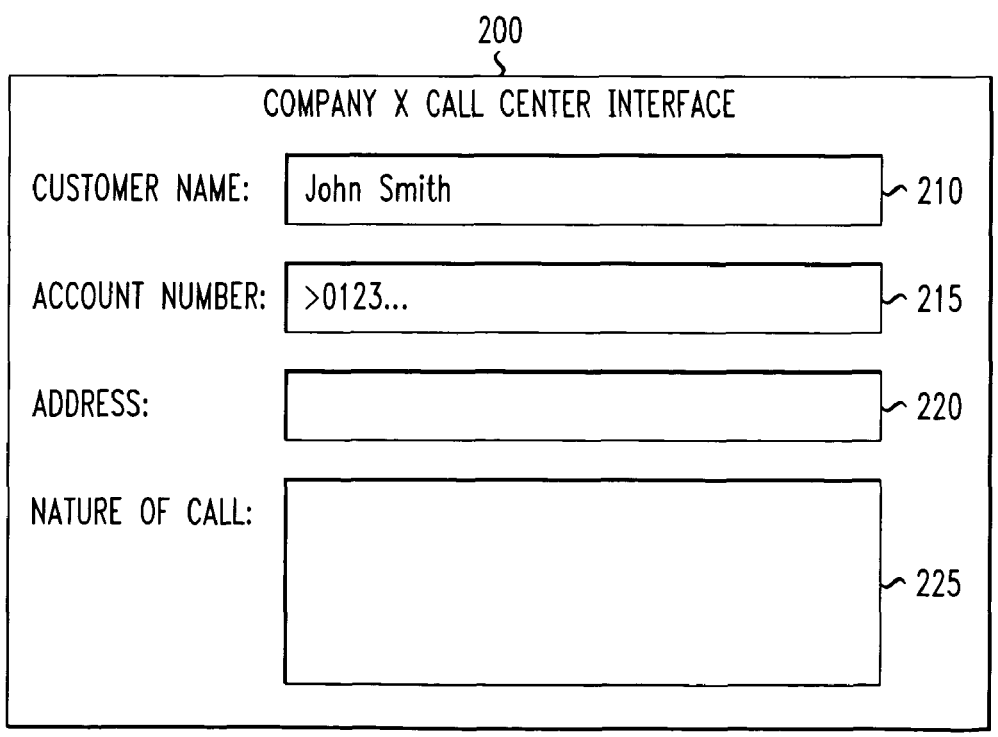
FIG. 2 illustrates an exemplary graphical user interface, as employed by a call center agent to enter information obtained from a caller.

FIG. 2 illustrates an exemplary graphical user interface 200 that may be employed by a call center agent to enter information obtained from the caller 110. As shown in FIG. 2, the exemplary graphical user interface 200 includes a number of information fields 210, 215, 220 and 225 that are frequently populated by a call center agent during a typical customer service communication. For example, the call center agent may query the caller 110 for a customer name, account number and address and enter such information in the corresponding fields 210, 215 and 220. In addition, once the call center agent has determined the nature of the call, the agent can enter a summary note in a field 230. Typically, an agent can hit a particular key on a keyboard, such as a tab button, to traverse the interface 200 from one field to another. The entry of information into each unique field can be considered distinct events. The field 210, 215, 220 or 225 where the cursor is currently positioned is generally considered to have the focus of the agent. In the example shown in FIG. 2, an agent has already entered a caller's name in field 210 and is currently in the process of entering an account number in field 215, as indicated by the caller. Thus, field 215 is said to have the focus of the agent.

Figure 3:
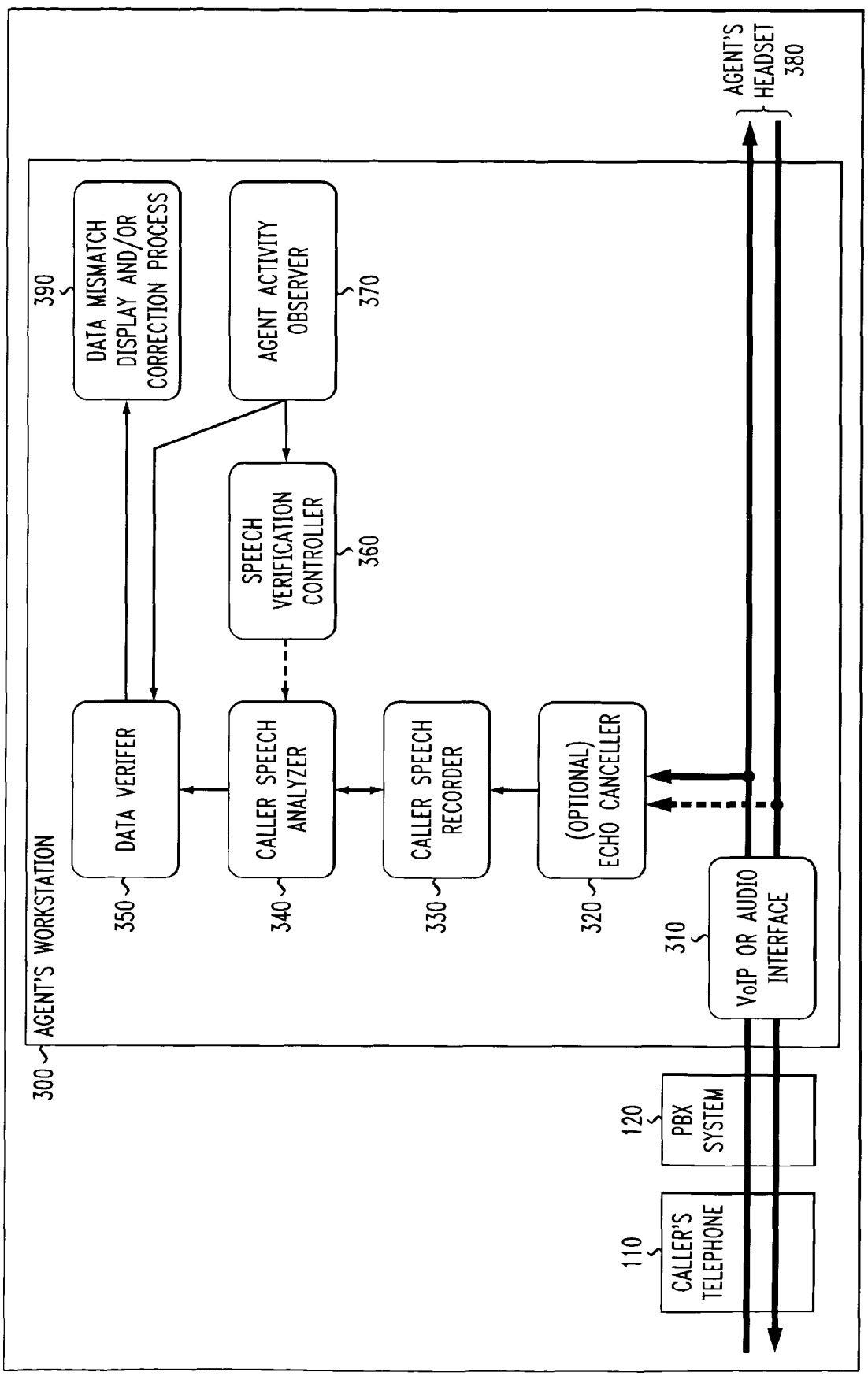
FIG. 3 is a schematic block diagram of one embodiment of an agent's workstation of FIG. 1 incorporating features of the present invention.

FIG. 3 is a schematic block diagram illustrating the agent's workstation 300 of FIG. 1 in further detail. As previously indicated, a caller employing a telephone 110 calls the call center 150 and is connected to the call center agent employing workstation 300. Each agent workstation 300 includes capabilities to support the traditional functions of a "live agent," such as an IP Softphone process, and optionally IVR capabilities to support the functions of an "automated agent." An IP Softphone emulates a traditional telephone in a known manner. As shown in FIG. 3, the exemplary workstation 300 is connected to the caller's telephone 110 through a Private Branch Exchange (PBX) switch 120 that may be employed, for example, to distribute calls among the employees of the enterprise associated with the call center 150.

The workstation 300 includes a voice over IP (VoIP) interface or another audio interface 310 for exchanging the audio information between the caller and the agent. Typically, the agent wears a headset 380, so the audio interface 310 generally provides the audio received from the caller to the speaker(s) in the agent's headset 380 and provides the audio received from the microphone in the agent's headset 380 for transmission to the caller. In this manner, the audio information is exchanged between the caller and the agent.

The workstation 300 also includes an optional echo canceller 320 for removing echoes from the audio signal. Thereafter, a caller speech recorder 230 stores the digitized speech of the caller, and optionally of the agent as well. In one embodiment, the stored speech is time-stamped. A caller speech analyzer 340, data verifier 350 and speech verification controller 360 cooperate to evaluate speech segments from the caller to determine if the text entered by the agent can be found in the prior audio stream. Generally, the caller speech analyzer 340 converts the speech to text and optionally indicates the N best choices for each spoken word. The data verifier 350 determines if the information content generated by the caller speech analyzer 340 matches the textual entry of the agent. The speech verification controller 360 selects an appropriate speech recognition technology to be employed based on the type of information to be identified (e.g., numbers versus text) and where to look in the speech segments. The speech verification controller 360 can provide the caller speech analyzer 340 with the speech recognition grammar to be employed, as well as the speech segments. The caller speech analyzer 340 performs the analysis to generate a confidence score for the top N choices and the data verifier 350 determines whether the text entered by the agent matches the spoken words of the caller.

The validation process can be triggered, for example, by an agent activity observer 370 that monitors the activity of the agent to determine when to validate entered textual information. For example, the agent activity observer 370 can observe the position of the cursor to determine when an agent has populate a field and then repositioned the cursor in another field, so that the textual information that has been populated can be validated. The workstation 300 also includes a data mismatch display/correction process 390 that can notify the agent if a discrepancy is detected by the designee preference database 400 between what was entered by the agent and what was recently spoken by the caller. In one variation, discussed further below in conjunction with FIG. 4, the voice input verification process 400 can also suggest corrections to the data.

Figure 4:
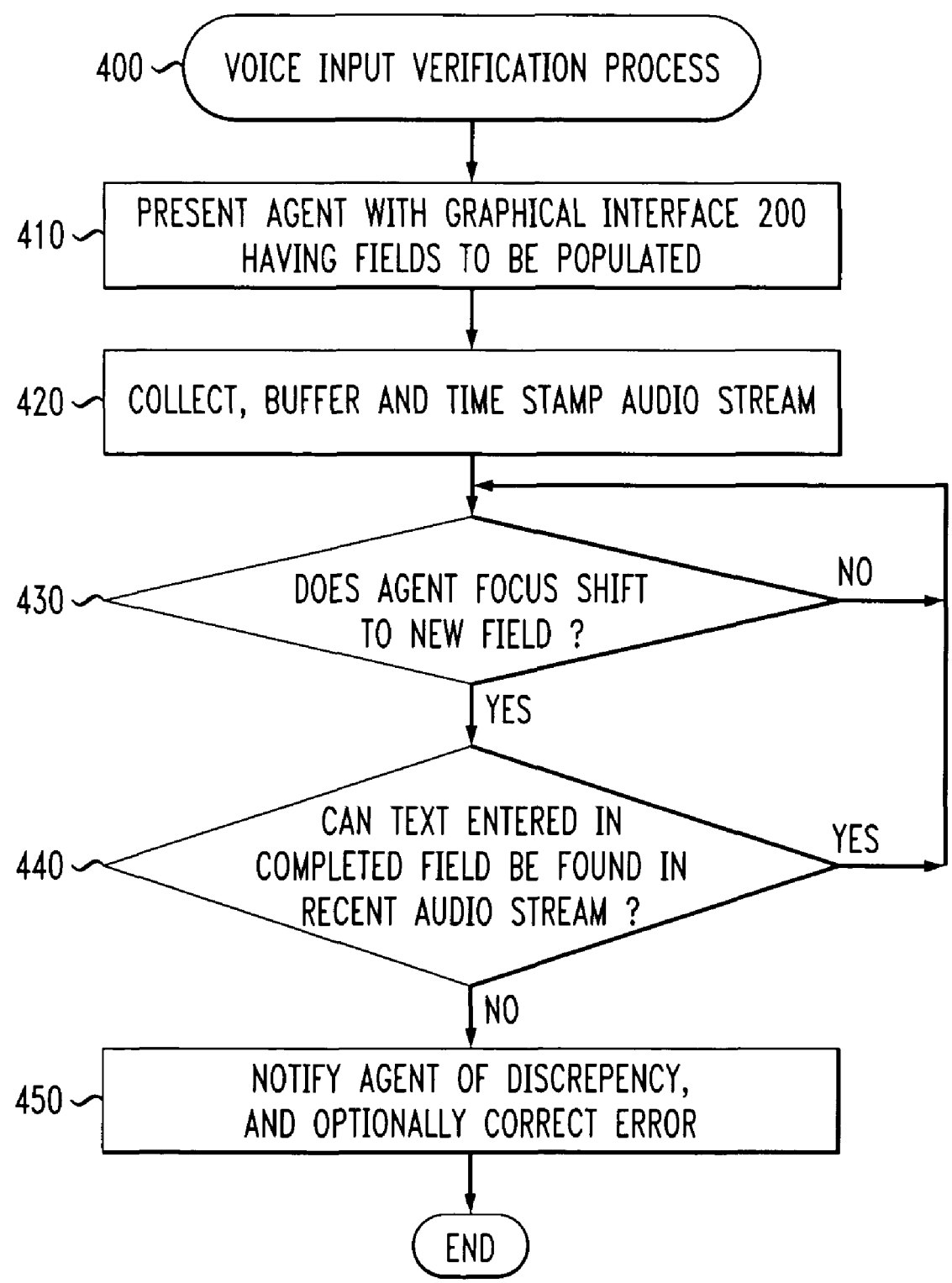
FIG. 4 is a flow chart describing an exemplary implementation of a voice input verification process as employed by the agent's workstation of FIG. 3.

FIG. 4 is a flow chart describing an exemplary implementation of a voice input verification process 400 as employed by the agent's workstation of FIG. 3. As shown in FIG. 4, the voice input verification process 400 initially presents the agent with a graphical interface 200 during step 410 having a number of fields to be populated, based on information obtained by the agent from the caller. Meanwhile, the voice input verification process 400 collects, buffers and time stamps the audio stream associated with the conversation between the agent and the caller during step 420. The audio recording and speech technology can be "conferenced" onto the call and supported through a centralized IVR server system, such as the CONVERSANT® System for Interactive Voice Response, commercially available from Avaya Inc., or via software directly executing on the agent's workstation 300.

A test is performed during step 430 to determine if the focus of the agent shifts to a new field (generally indicating that he or she has completed the textual entry for a field). If it is determined during step 430 that the focus of the agent has not shifted to a new field, then program control returns to step 430 until such a change in focus is detected. If, however, it is determined during step 430 that the focus of the agent shifts to a new field, then program control proceeds to step 440.

A test is performed during step 440 to determine if the text entered in the completed field is found in the recent audio stream. The "recent" audio stream can be a fixed time interval to be searched or a variable time interval, for example, since the previous change of focus. By constraining the speech recognition to the "recent" audio stream, the problem of agent input verification is much simpler than open dictation, as the possible vocabulary the system must recognize is significantly reduced over open conversation.

The comparison of the entered text to the spoken words of the caller can be performed in accordance with the teachings of Jennifer Chu-Carroll, "A Statistical Model for Discourse Act Recognition in Dialogue Interactions," http://citeseer.n- j.nec.com/20046.html (1998); Lin Zhong et al., "Improving Task Independent Utterance Verification Based On On-Line Garbage Phoneme Likelihood," http://www.ee.princeton.edu/~lzhong/publications/report-UV-2000.pdf (2000); Andreas Stolcke et al., "Dialog Act Modeling for Conversational Speech," Proc. of the AAAI-98 Spring Symposium on Applying Machine Learning to Discourse Processing, http://citeseer.nj.nec.com/stolcke98dialog.html (1998); Helen Wright, "Automatic Utterance Type Detection Using Suprasegmental Features," Centre for Speech Technology Research, University of Edinburgh, Edinburgh, U.K., http://citeseer.nj.nec.com/wright98automatic.html (1998); J. G .A. Dolfing and A. Wendemuth, "Combination Of Confidence Measures In Isolated Word Recognition," Proc. of the Int'l Conf. on Spoken Language Processing, http://citeseer.nj.nec.com/dolfing98combination.html (1998); Anand R. Setlur et al., "Correcting Recognition Errors Via Discriminative Utterance Verification," Proc. Int'l Conf. on Spoken Language Processing, http://citeseer.nj.nec.com/setlur96correcting.html (1996); or Gethin Williams and Steve Renals, "Confidence Measures Derived From An Acceptor HMM," Proc. Int'l Conf. on Spoken Language Processing (1998), each incorporated by reference herein.

Generally, a speech recognition technique is applied to the recent audio stream to obtain a textual version of the spoken words. The textual version of the spoken words is then compared to the textual entry made by the agent and a confidence score is generated. If the confidence score exceeds a predefined threshold, then the textual entry of the agent is assumed to be correct.

If it is determined during step 440 that the text entered in the completed field is found in the recent audio stream, then the textual entry of the agent is assumed to be correct and program control returns to step 430 to process the text associated with another field, in the manner described above. If, however, it is determined during step 440 that the text entered in the completed field cannot be found in the recent audio stream, then program control proceeds to step 450. The agent is notified of the detected discrepancy during step 450, and optionally, an attempt can be made to correct the error. For example, the results of the speech recognition on the spoken words of the caller can be used to replace the text entered by the agent. In a further variation, information in a customer database can also be accessed to improve the accuracy of the textual entry. For example, if the caller's name has been established in an earlier field to be "John Smith" and an error is detected in the account number field, then all account numbers associated with customers having the name "John Smith" are potential account numbers. In addition, the accuracy of entered information can also be evaluated using, for example, checksums on an entered number string.

Figure 5:
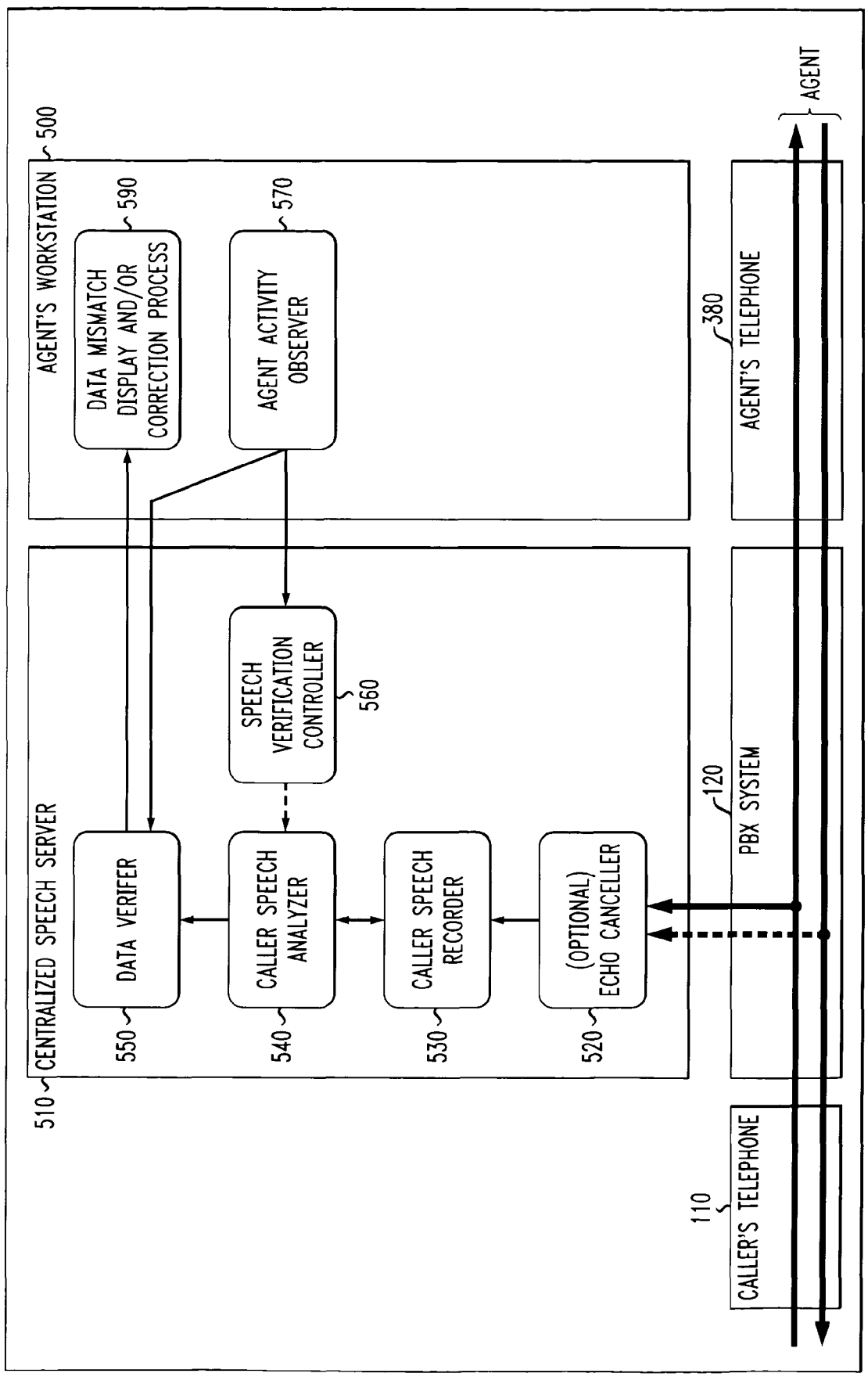
FIG. 5 is a schematic block diagram of an alternate embodiment of an agent's workstation of FIG. 1 incorporating features of the present invention.

FIG. 5 is a schematic block diagram of an alternate server embodiment of an agent's workstation 500 of FIG. 1 incorporating features of the present invention. In the server based embodiment, a workstation-based proxy 570 is required to monitor agent usage, or the host system must send duplicate screen information to the workstation 500 and to the server 510 to provide both systems with screen access. Access to the audio stream is provided by routing the call in and back out of the server system 510 before being further extended to the agent at the workstation 500. Information on which agent (and thus which workstation) is monitored can be provided by standard call center CTI system(s).

In the server based embodiment, a number of the functional blocks that were exclusively in the workstation 300 in the stand-alone embodiment of FIG. 3 are now distributed among the server 510 and the workstation 500. For example, the server 510 includes the optional echo canceller 520 for removing echoes from the audio signal; caller speech recorder 530 for storing the digitized speech of the caller (and optionally of the agent); caller speech analyzer 540, data verifier 550 and speech verification controller 560. The agent activity observer 570 that monitors the activity of the agent to determine when to validate entered textual information and data mismatch display/correction process 590 that notifies the agent of a data discrepancy are resident on the workstation 500.

Figure 6:
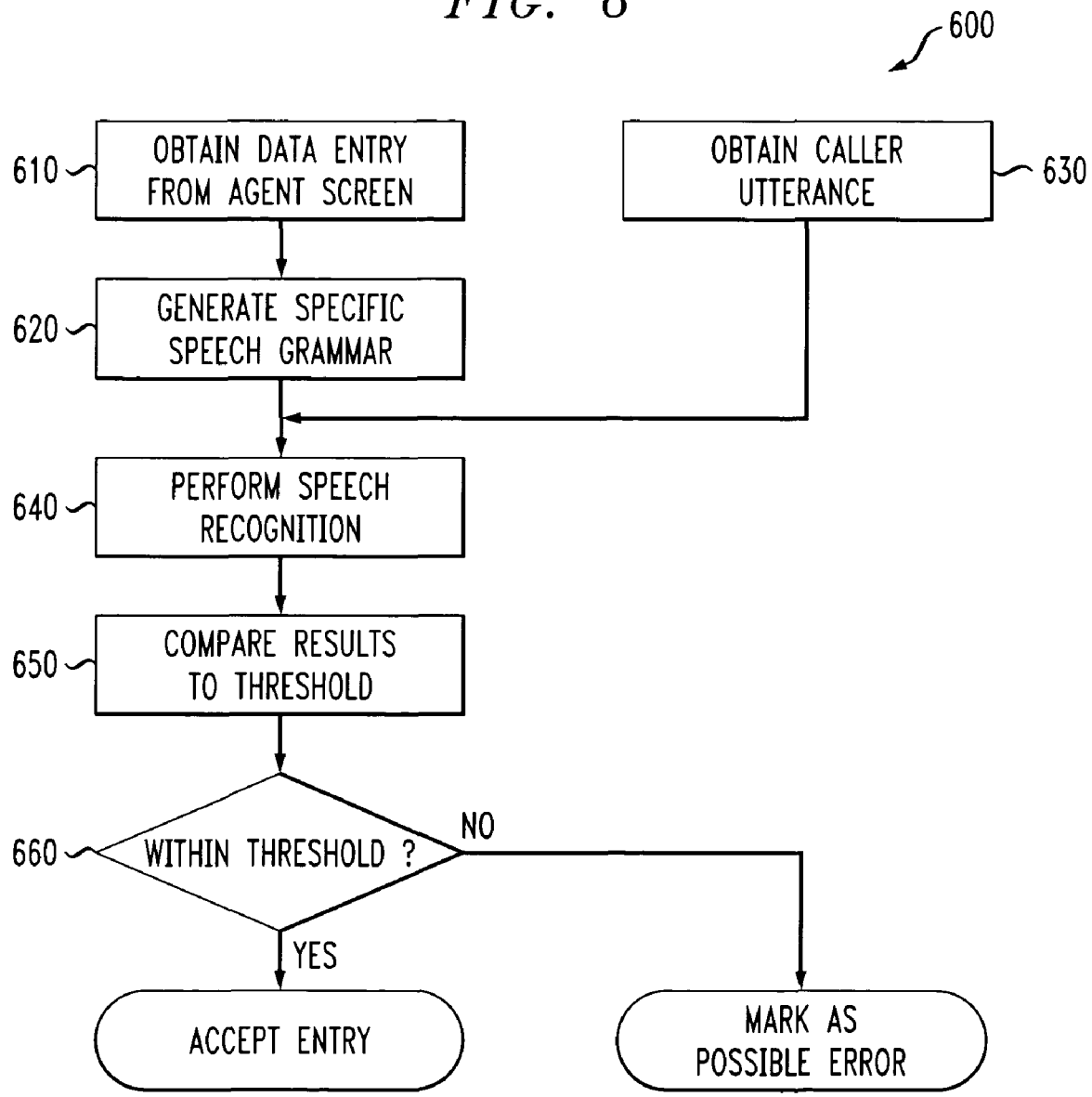
FIG. 6 is a flow chart describing one implementation of a data validation process incorporating features of the present invention.

FIG. 6 is a flow chart describing one implementation of a data validation process (a priori) 600 incorporating features of the present invention. Generally, the data validation process (a priori) 600 uses the data entered on the agent's display to generate a specific grammar. As shown in FIG. 6, the data entry is obtained during step 610 from the agent's terminal and the caller utterance is obtained during step 630. The specific grammar is generated during step 620. The audio data containing the caller's speech is passed to the speech recognizer (caller speech analyzer 340) using the grammar created during step 620. A speech recognition is performed during step 640, and the recognition attempt computes a confidence measure based on one of the many techniques described in the papers referenced above, such as online garbage model or free-phone decoding. The top N choices can optionally be presented to the agent. In addition, the top N choices can optionally be filtered prior to presenting them to the agent to see if each choice is a valid entry for the field (e.g., account numbers generated by the recognizer corresponding to an invalid or inactive accounts should not be presented).

The generated confidence score(s) are compared to a predefined threshold during step 650. A test is performed during step 660 to determine if the predefined threshold is exceeded. If it is determined during step 660 that the confidence score exceeds a predefined threshold, then the data entry passes (i.e., is accepted). If the confidence score does not exceed the predefined threshold, then the data entry fails (i.e., is marked as a possible error).

Figure 7:
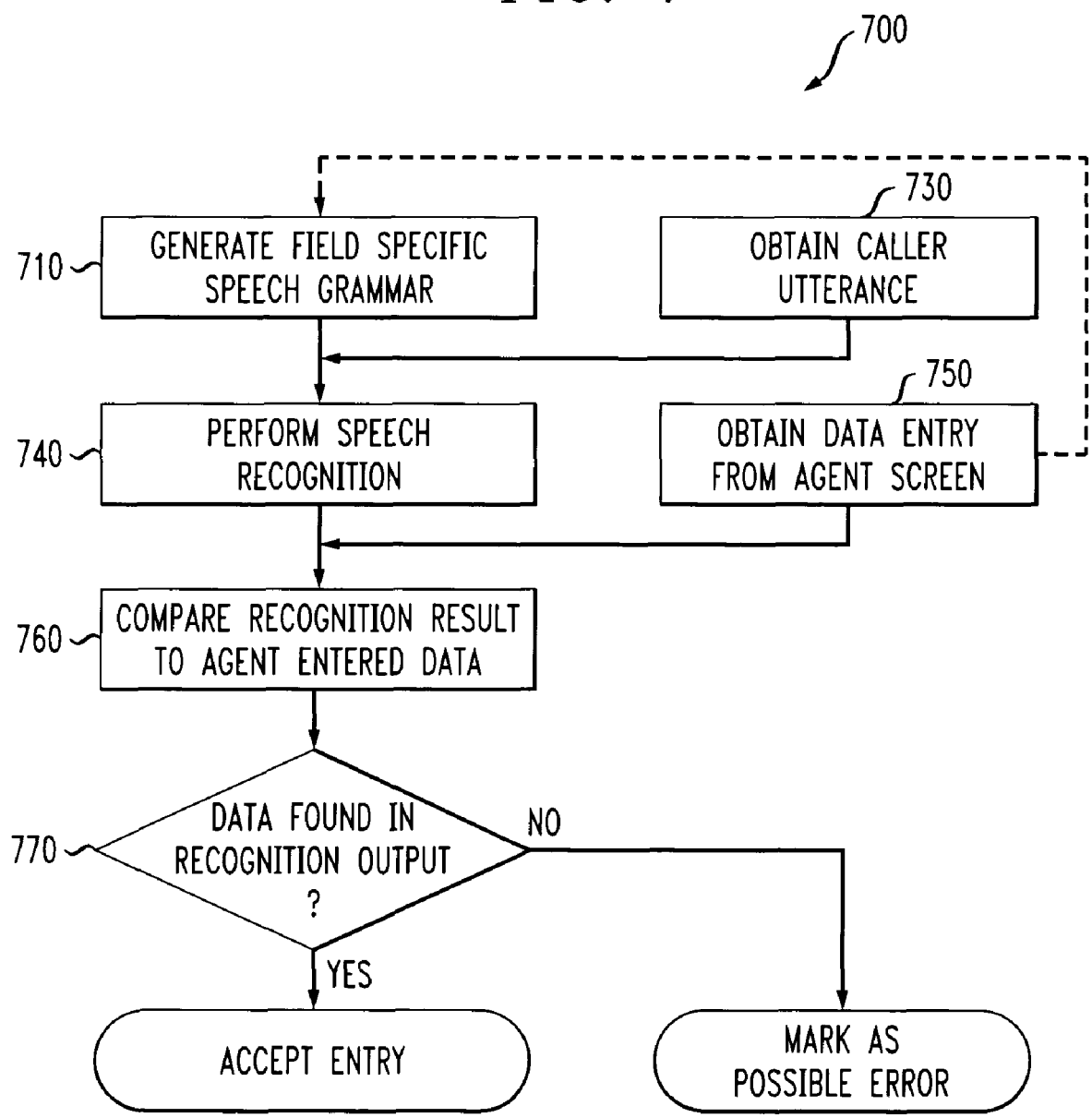
FIG. 7 is a flow chart describing an alternate implementation of a data validation process incorporating features of the present invention.

FIG. 7 is a flow chart describing an alternate implementation of a data validation process (post priori) 700 incorporating features of the present invention. Generally, the data validation process (post priori) 700 determines the grammar used for the recognition based on the field type of the current field (for example, a Social Security number would be a nine digit grammar). As shown in FIG. 7, a field specific grammar is generated during step 710 and the caller utterance is obtained during step 730. The data entered by the agent is compared to the output of the speech recognition during step 760 and a test is performed during step 770 to determine if the entered data is found in the recognition output. Typically, the top N entries from the recognizer are consulted. The grammar used can be "sensitized" to the data expected by manipulating arc penalties and weights (see steps 750, 710). N is typically 4 or less. The top N choices can optionally be evaluated prior to presenting them to the agent to ensure that each choice is a valid entry for the field, in the manner described above. If it is determined during step 770 that the entered data is found in the recognition output, then the data entry passes (i.e., is accepted). If the entered data is not found in the recognition output, then the data entry fails (i.e., is marked as a possible error).

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for validating a textual entry of spoken words of a caller, comprising:
   receiving a telephone call from said caller;
   obtaining a textual entry of said spoken words from a call agent;
   converting said spoken words to text using a speech recognition technique to generate converted text; and
   comparing said textual entry to said converted text to confirm an accuracy of said textual entry substantially during said telephone call.

2. The method of claim 1, further comprising the step of recording said spoken words.

3. The method of claim 2, further comprising the step of time-stamping said recording.

4. The method of claim 1, further comprising the step of constraining said comparing step to a recent audio stream.

5. The method of claim 1, further comprising the step of constraining said comparing step to a recent audio stream corresponding to a completed field in a user interface.

6. The method of claim 1, further comprising the step of constraining said comparing step to a recent audio stream since a previous field was completed.

7. The method of claim 1, further comprising the step of notifying an agent of an error.

8. The method of claim 1, further comprising the step of correcting a detected error.

9. The method of claim 1, further comprising the step of suggesting at least one alternative for a detected error.

10. The method of claim 1, further comprising the step of selecting said speech recognition technique based on properties of said spoken words.

11. The method of claim 1, wherein said accuracy is confirmed by comparing a confidence score to a threshold value.

12. An apparatus for validating a textual entry of spoken words of a caller, comprising:
    a memory; and
    at least one processor, coupled to the memory, operative to:
    receive a telephone call from said caller;
    obtain a textual entry of said spoken words from a call agent;
    convert said spoken words to text using a speech recognition technique to generate converted text; and
    compare said textual entry to said converted text to confirm an accuracy of said textual entry substantially during said telephone call.

13. The apparatus of claim 12, wherein said processor is further configured to constrain said comparison to a recent audio stream.

14. The apparatus of claim 12, wherein said processor is further configured to notify an agent of an error.

15. The apparatus of claim 12, wherein said processor is further configured to correct a detected error.

16. The apparatus of claim 12, wherein said processor is further configured to suggest at least one alternative for a detected error.

17. The apparatus of claim 12, wherein said processor is further configured to select said speech recognition technique based on properties of said spoken words.

18. An article of manufacture for validating a textual entry of spoken words of a caller, comprising a machine readable medium containing one or more programs which when executed on a machine implement the steps of:
    receiving a telephone call from said caller;
    obtaining a textual entry of said spoken words from a call agent; converting said spoken words to text using a speech recognition technique to generate converted text; and
    comparing said textual entry to said converted text to confirm an accuracy of said textual entry substantially during said telephone call.

19. A method for validating a spoken delivery of a textual script, comprising:
    obtaining a spoken delivery of said textual script by a call agent;
    converting said spoken delivery to text using a speech recognition technique to generate converted text; and
    comparing said textual script to said converted text to confirm an accuracy of said spoken delivery substantially during said spoken delivery of said textual script.

20. The method of claim 19, further comprising the step of constraining said comparing step to a recent audio stream.

21. The method of claim 19, further comprising the step of notifying an agent of an error.

22. The method of claim 19, further comprising the step of selecting said speech recognition technique based on properties of said textual script.

23. The method of claim 19, wherein said accuracy is confirmed by comparing a confidence score to a threshold value.

24. The method of claim 1, wherein said converting step employs a field specific speech grammar.

25. The method of claim 19, wherein said converting step employs a field specific speech grammar.

* * * * *